United States Patent [19]

Reusch et al.

[11] 4,365,662

[45] Dec. 28, 1982

[54] METHOD FOR CHARGING AND DISCHARGING A LATENT-HEAT STORAGE MEDIUM AND HEAT STORAGE

[75] Inventors: Heinz Reusch, Höxter; Robert Kreikenbohm, Stadtoldendorf, both of Fed. Rep. of Germany

[73] Assignee: Stiebel Eltron GmbH & Co. KG, Holzmindenl, Fed. Rep. of Germany

[21] Appl. No.: 278,006

[22] Filed: Jun. 25, 1981

Related U.S. Application Data

[62] Division of Ser. No. 949,026, Oct. 6, 1978.

[30] Foreign Application Priority Data

Oct. 10, 1977 [DE] Fed. Rep. of Germany ....... 2745492
Jul. 17, 1978 [DE] Fed. Rep. of Germany ....... 2831325

[51] Int. Cl.³ .......................................... F28D 17/00
[52] U.S. Cl. ................................ 165/10; 165/104.11; 165/111
[58] Field of Search .............. 165/104.11, 111, 10

[56] References Cited

U.S. PATENT DOCUMENTS

| | | | |
|---|---|---|---|
| 4,086,958 | 5/1978 | Lindner et al. | 165/111 X |
| 4,109,702 | 8/1978 | Greene | 165/111 X |
| 4,146,087 | 3/1979 | Johansson | 165/132 |
| 4,219,075 | 8/1980 | Laing | 165/111 X |

*Primary Examiner*—Albert W. Davis, Jr.
*Attorney, Agent, or Firm*—Abelman, Frayne & Rezac

[57] ABSTRACT

A heat storage unit is disclosed having a vertically cylindrical container accommodating a latent-heat storage medium and a conduit introducing a heat carrier liquid not miscible with the medium at the bottom of the container. The conduit has an exit nozzle which is located outside the axial center of the cylinder and nearly perpendicular to the radius of the cylinder so that the heat carrier liquid enters the cylinder at the bottom in a direction to cause the heat storage melt to be set into a rotary motion.

5 Claims, 3 Drawing Figures

METHOD FOR CHARGING AND DISCHARGING A LATENT-HEAT STORAGE MEDIUM AND HEAT STORAGE

This is a division of application Ser. No. 949,026, filed Oct. 6, 1978.

The invention relates to a method for charging and discharging a latent-heat storage medium by means of a heat carrier liquid not miscible with it and flowing through this medium from the bottom upwardly and collecting on top. Furthermore, the invention relates to a heat storage for carrying out the method.

Latent-heat storage devices have the advantage that large amounts of heat can be stored in a small volume. The heat of fusion of a material, for example, a salt, is used. In the charged state, the storage medium is in the liquid phase. In the discharged state, the storage medium is solid.

The german Laid-Open Document No. 19 53 604 proposed for the heat exchange during charging and discharging a liquid heat carrier medium that, when it is not miscible with the storage medium, it may flow directly through the latter.

In the publication F. Lindner, Grundlagen der Solartechnik I, (Fundamentals of Solar Engineering), pp. 205–235, the cited direct flow through the storage medium is shown in detail.

The heat carrier liquid bubbles up from below to the top through the storage medium. Concurrently, the heat exchange between storage medium and heat carrier liquid takes place. It has been found that the bubbling through the storage medium can lead to a considerable foaming on the surface of the heat carrier liquid collecting on top of the storage medium. Accordingly it is to be expected that foam enters the heat carrier cycle. This is undesirable since the circulating pump provided in the heat carrier cycle might be damaged, and, on the other hand, foam reduces the heat transfer from a heat source to a receiver. In addition, with the foam, particles of the storage medium can enter the outer cycle of the heat carrier liquid.

On the other hand, with such heat storage units where the heat carrier liquid is supplied from below, it may occur during the discharge of the storage medium that, in the vicinity of the supply line opening, ice forms to block the opening, when warm storage medium for heating the heat carrier liquid is still available on top.

It is the object of the invention to provide a method of the above-mentioned type, and a heat storage unit so that foam formation is reduced. Another object of the invention is to improve, in such heat storage units, the heat exchange at the start of the charging of the storage medium and near the end of the discharging of the storage medium.

A method in accordance with the invention is characterized in that the heat carrier liquid is conducted under pressure into the storage medium in such a direction and through such an entry cross section that in the melt of the storage medium a flow with a horizontal flow component is built up and the melt is set into rotary motion by the horizontal flow component. Through the horizontal flow component, the heat carrier liquid does not enter the collecting space vertically from below to the top via the storage medium. The possibility of foam formation is, on the one hand, reduced and, on the other hand, the destruction of foam is encouraged.

It is also an advantage that an efficient heat transfer from the storage medium to the heat carrier liquid or vice versa is ensured.

A heat storage unit in accordance with the invention with a latent-heat storage medium accommodated in a container and a conduit carrying heat carrier liquid and discharging at the bottom into the container is characterized in that the container has a vertical cylinder axis and the conduit has an exit nozzle which is located outside the axial center of the cylinder and whose direction of discharge is substantially horizontal and nearly perpendicular to the radius of the cylinder. With this heat storage unit, the heat carrier liquid enters the cylinder such that the melt and the heat carrier liquid situated above it is set into a uniform rotary motion.

In a preferred embodiment of the heat storage unit, the mouth of a return line is located in the axial center of the cylinder above the storage medium. As a result the heat carrier liquid is conducted from the heat storage unit in a quiescent region which practically does not participate in the rotary motion.

The heat exchange at the start of the charging and towards the end of the discharging is preferably improved by providing the supply conduit with openings distributed over the height of the heat storage and locating the uppermost opening in the region of the upper boundary layer of the discharged storage medium. The uppermost opening in the region of the upper boundary layer of the storage medium is arranged so that is can initiate the melting process when the storage medium has solidified. With a storage medium that crystalizes like snow, the uppermost opening may be located barely below the boundary layer since snow-like crystalized storage medium does not close the uppermost opening so as to prevent heat carrier liquid from entering the storage medium. If one must expect that the storage medium in the solidified state also blocks the uppermost opening, then it is located preferably above the maximum boundary layer level appearing with discharged storage medium.

In the course of melting the discharged storage medium, the individual openings are melted open successively from top to bottom. The warm heat carrier liquid entering the storage medium through the openings charges the storage unit.

During discharge of the storage medium, the solidification of the storage medium will proceed from bottom to top. Even when lower openings are blocked by solidified storage medium, the heat exchange through upper openings continues. Hence the storage medium can be completely discharged.

The described openings thus lead, on the one hand, to a rapid transition from the discharged state of the storage medium to its charged state, and, on the other hand, to complete discharge near the end of the discharging process.

In a preferred embodiment of the invention, opening cross sections of lower openings are larger than opening cross sections of upper openings. As a result, when the storage medium is in the liquid state, a larger amount of heat carrier liquid enters the storage medium through lower openings than does through upper openings. Thus a large, preferably a major portion of the heat carrier liquid is in contact with the storage medium over a long stretch. Preferably the opening cross section of the lowermost opening is about 70 to 90% of the sum of all opening cross sections.

In an advantageous improvement of the invention, the openings are formed at the pipe outlet of the supply conduit and the pipe outlets point obliquely downward. This pipe outlet arrangement leads to a further acceleration of the melting of the storage medium.

In a further embodiment of the invention, the pipe outlets terminate in the vicinity of the inside circumference of the heat storage unit and are directed tangentially to the circumference. Thus the heat carrier liquid entering the storage medium under pressure sets this medium into rotary motion which is favorable for the avoidance of foam formation on the surface.

Further advantageous embodiments of the invention are found in the following description of drawings. In the drawings.

Figure 1:
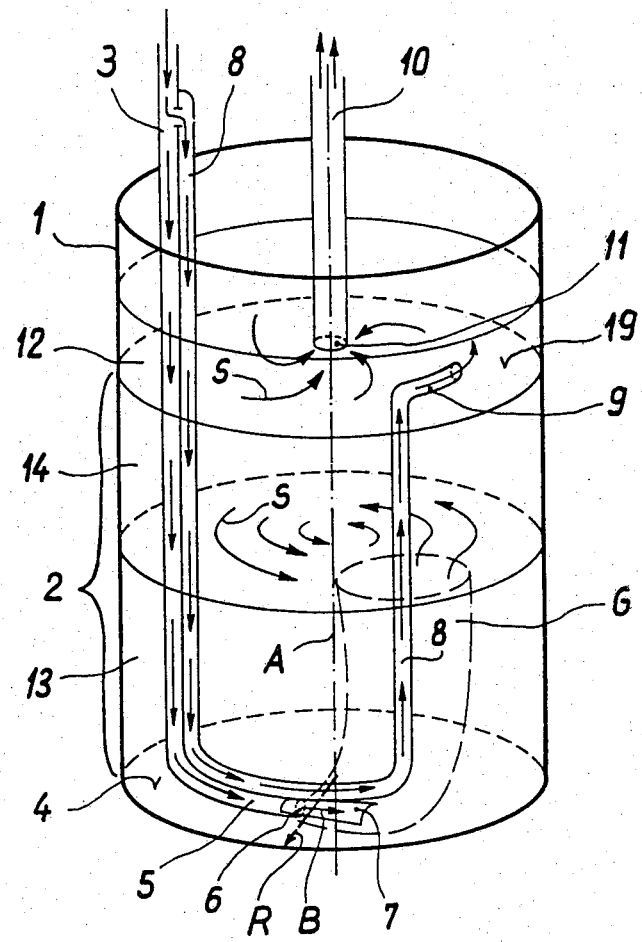
FIG. 1 shows a perspective schematic view of an embodiment of a heat storage unit.

A storage medium 2 is located in a cylindrical container 1 with a vertical cylindrical axis A. A supply conduit 3 leads into the container 1. This supply conduit runs along the side of container 1 to its bottom 4. At the bottom it runs along a region 5 parallel to the container circumference and terminates in an exit nozzle 6. The exit nozzle 6 at the bottom 4 is remote from the cylinder axis A. It is laid out so that its exit direction B is substantially perpendicular to the radius R and is substantially horizontal. A sheet metal deflector 7 is placed in front of the exit nozzle.

In the embodiment of FIG. 1 an auxiliary conduit 8 branches off from the supply conduit 3 upon its entry into container 1. This auxiliary conduit runs parallel to the supply conduit 3, extends for a stretch in the exit direction B behind the exit nozzle 6 and then turns upward. The auxiliary conduit 8 terminates above the storage medium 2 into an exit section 9. It has the same direction as the exit nozzle 6. Supply conduit 3 and auxiliary conduit 8 are connected with each other with high heat conduction, for example, by a soldered connection. Instead of the auxiliary conduit 8 other heat conductors with which a zone may be melted can be used.

Figure 3:
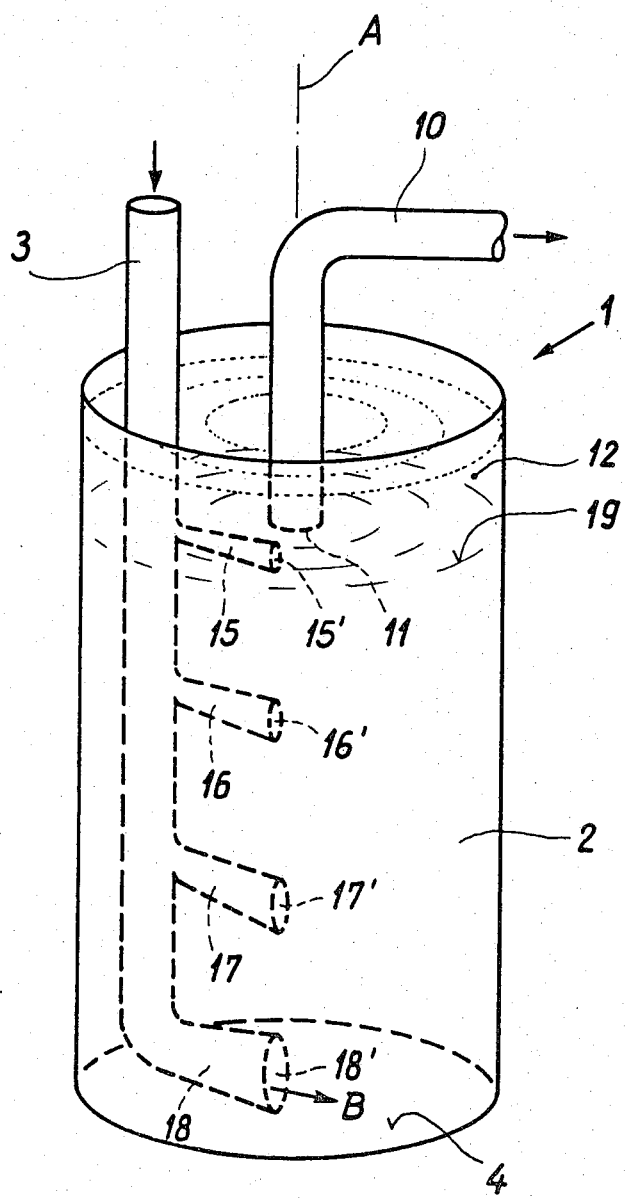
FIG. 3 shows another embodiment of a heat storage unit.

Container 1 also has connected to it a suction conduit 10 which has a suction opening 11 which is located above, for example several centimeters above the storage medium 2 on the cylinder axis A (see FIGS. 1 and 3).

The supply conduit 3 and the suction conduit 10 is connected to a cycle of a heat carrier liquid. This liquid is conducted outside the storage container via a pump through a heat source, particularly solar collectors. The conduits can be switched to connect to heat receivers, for example via a heat exchanger, to solar space heaters. As heat carrier liquid one uses a liquid which is not miscible with the storage medium 2 and does not react with it. Its evaporation temperature lies far above the temperature to be expected in the heat source. For example, petroleum is suitable as heat carrier liquid. Mineral oils may also be used.

As storage medium use is made of a substance whose melting temperature is between the temperature reached in the heat source and the temperature desired in the heat receiver. $Ca(NO_3)_2$, with a melting temperature of 42° C. or $Na_2S_2O_3$ with a melting temperature of 48° C. have proven to be reliable substances.

Based on a completely charged storage medium, the method for discharging the storage medium proceeds substantially as follows:

The storage medium 2 is completely molten in the charged state. Above the melt is a layer 12 of the heat carrier liquid. As long as heated heat carrier liquid is supplied by the supply conduit 3 from the heat source, the temperature of the melt can rise. The heat carrier liquid exits from the exit nozzle 6 in the exit direction B. Through the tangential exit it produces a rotary flow S in the melt. The rotary flow S produces a convective heat exchange, uniform throughout the entire melt, between melt and heat carrier liquid, on the one hand. On the other hand, the heat carrier liquid enters layer 12 with a small motion component in the vertical direction, so that a bubble and foam formation is largely avoided. The layer 12 also participates in the rotary flow. The rotary flow proceeds in the manner of a hydrocyclone. The drawing-off of the heat carrier liquid which has given up its heat energy to the melt proceeds by arranging the suction conduit in the virtually nonmoving vicinity of cylinder axis A.

If cold heat carrier medium is supplied through the supply conduit to discharge the melted storage medium, the melt is also set into rotary motion. All zones of the melt participate in the heat exchange. Because of its density being lower than that of the melt, the heat carrier liquid slowly moves upward in the course of the rotary flow. The storage medium solidifies while the melt is cooling. The resulting crystals descend because of their greater density. A blockage of exit nozzle 6 is prevented by the heat carrier liquid exiting from it under pressure.

During the discharging process, a state as illustrated in FIG. 1 will develop, where above a zone 13 with solidified storage medium a zone with still melted medium is located. The heat carrier liquid travels to zone 14 through a region G located in its flow direction. The heated heat carrier liquid is drawn off by the suction conduit 10.

If in the heat storage unit of FIG. 1, after complete discharge of the storage medium, the latter is to be charged again, it may occur that the crystals lie so close together that the exit nozzle 6 is blocked. Hot heat carrier medium flows through the auxiliary conduit 8, via the exit section 9, into the layer 12 of the heat carrier medium. Through the arrangement of exit section 9, rotary flow may be imparted to layer 12. The melting process may start with the boundary layer level 19 of the storage medium adjacent to the layer 12. Especially conduit 8 is heated, melting the storage medium in its vicinity. This unblocks the exit nozzle 6 and the heat carrier liquid can melt the storage medium. In order to favor the buildup of the desired flow, the auxiliary conduit 8, in its section between the exit section 9 and the exit nozzle 6 in the storage medium, may be curved accordingly. The rotary flow S, affecting the entire storage medium, progresses from the top to the bottom above the solidified storage medium.

Figure 2:
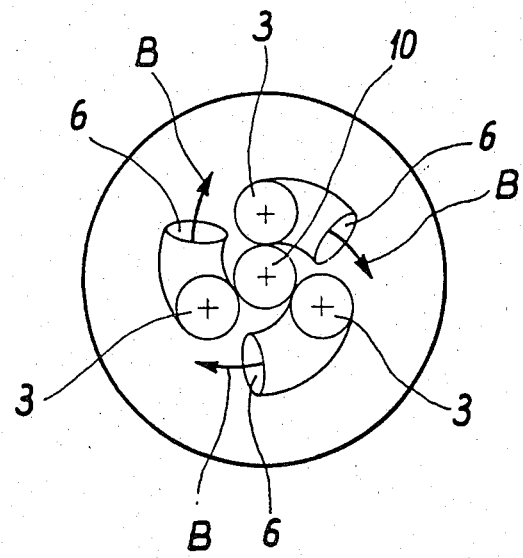
FIG. 2 shows a top schematic view of an advanced embodiment.

In the embodiment of FIG. 2 there are three supply conduits 3 and accordingly three exit nozzles 6. The heat exchange process can be accelerated thereby.

In practice it has been found that the cross section of the exit nozzle 6 should not be under 10 mm. The flow pressure of the exit nozzle 6 should be merely large enough to produce a slow rotary flow. The sheet metal deflector 7 ensures that also the bottom 4 of container 1 is swept by the flow.

The cross section of the exit section 9 and of the auxiliary conduit 8 of FIG. 1 is dimensioned so that the flow resistance is greater than that of conduit 3 and of exit nozzle 6. The auxiliary conduit 8 need be active only as long as the exit nozzle 6 is blocked by storage medium 2. The exit section 9 may also terminate as overflow above the layer 12.

The motion of the melt leads to a uniform development of the phase boundary between the melted and the solidified phase of the storage medium (see FIG. 1). The necessarily developing volume changes of the storage medium do not manifest themselves in a troublesome manner.

In the embodiment of FIG. 3, the supply conduit 3 has four pipe outlets 15, 16, 17 and 18 which have openings 15', 16', 17' and 18'. The pipe outlet 18 with its opening 18' corresponds to region 5 or exit nozzle 6 of FIG. 1. The pipe outlets 15 to 18 have approximately the same distance from one another. They are directed obliquely downward in such a manner that the heat carrier liquid exiting from them has a small vertical flow component. The pipe outlets 15 to 18 are located in the vicinity of the inside circumference of heat storage unit 1 in such a way that the heat carrier liquid exiting from them imparts a rotary motion to the storage medium, as described above.

The opening cross sections of openings 15' to 18' become progressively larger in the downward direction. The opening cross section of the lowermost opening is about 70 to 90% of the sum of all opening cross sections.

The uppermost opening 15' lies above the boundary layer level 19 between the storage medium 2 and the layer 12 of the heat carrier liquid.

The heat storage unit described operates as follows:

In the discharged state, the storage medium is in solid form. The openings 16', 17' and 18' are, therefore, blocked.

If, for example from solar collectors, hot heat carrier liquid enters supply conduit 3, the heat carrier liquid can, at first, exit only through opening 15'. The heat carrier liquid exiting through opening 15' melts the storage medium in the vicinity of boundary layer level 19. Through the obliquely downward direction of the pipe outlet 15 the melting progresses downwardly. The cooled heat carrier liquid is drawn off through suction conduit 10 and conducted to the solar collectors in the example.

As soon as the storage medium has been melted through the opening 15' up to opening 16', hot heat carrier liquid enters the storage medium through opening 16' also. As a result, the storage medium in the cross section region of the heat storage unit 1 below opening 16' is melted. This applies accordingly to openings 17' and 18'. In the course of unblocking of lower openings the rate of flow of the heat carrier liquid exiting from upper openings becomes smaller so that in the end, with the storage medium completely melted, a major portion of the heat carrier liquid exits through opening 18' so that it virtually flows through the entire height of the storage medium for heat exchange.

After charging the storage medium, it is available for discharging. During the discharging process, cold heat carrier liquid from heat receivers is conducted through the supply conduit 3 to the liquid warm storage medium 2 and conducted after heating to heat receivers through the suction conduit 10.

Towards the end of the discharging of the storage medium it will crystallize first at the bottom. As a result, opening 18' is closed. The heat exchange can proceed, however, through opening 17', 16' and 15' until openings 17' and 16' have been closed. When the storage medium above openings 16' has also solidified, the discharging process has ended.

The openings distributed over the height of the storage medium, both when a discharging is to follow a partial charging, and when a charging is to follow a partial discharging, provide that the heat exchange takes place without delay.

Even with the embodiment of FIG. 3 it is possible to provide several supply conduits (see FIG. 3) and/or several openings at any height level. The pipe outlets need not be of equal length. They may also be arranged so that any upper pipe outlet is directed towards the discharge region of the pipe outlet underneath. By dimensioning the opening cross sections and the direction and arrangement of the pipe stubs regarding quantity and spacings, desired charging and discharging characteristics may be obtained as required.

The invention is not restricted to the embodiments described. For example, the suction line 10 may also be arranged outside the cylinder axis. Containers with other cross sections may also be used.

The described method and the described heat storage unit can be used with numerous heat storage media and heat carrier liquids selected in accordance with the desired conditions.

We claim:

1. A heat storage unit, including:
   a cyclindrical vertically arranged storage tank;
   a mass of normally solid, liquefiable heat storage material contained within said tank;
   a mass of heat carrier liquid immiscible with said heat storage material and at least partially filling said tank;
   an exit conduit extending into said tank and terminating centrally thereof within said mass of heat carrier liquid;
   an inlet conduit extending into said tank and terminating within said tank in plural discharge openings spaced vertically of said tank and spaced radially from the vertical axis thereof, at least one of said openings being located within said mass of heat carrier liquid and spaced from said heat storage material when said material is in a solidified condition;
   each of said openings being oriented in a direction substantially perpendicular to a radius of the tank and in the same general direction as each other for a flow of heat carrier liquid therethrough to induce a rotary circulatory motion within the contents of said tank.

2. A heat storage unit, including:
   a cyclindrical vertically arranged storage tank;
   a mass of normally solid, liquifiable heat storage material contained within said tank;
   a mass of heat carrier liquid immiscible with said heat storage material and at least partially filling said tank;
   an exit conduit extending into said tank and terminating centrally thereof within said mass of heat carrier liquid;
   an inlet conduit extending into said tank and terminating within said tank in plural discharge openings spaced vertically of said tank and space radially from the vertical axis thereof, at least one of said openings being located within said mass of heat carrier liquid and spaced from said heat storage material when said material is in a solidified condition;

each of said openings being oriented in a direction substantially perpendicular to a radius of the tank and in the same general direction as each other for a flow of heat carrier liquid therethrough to induce a rotary circulatory motion within the contents of said tank;

said openings serially being of progressively increased cross-section from said one discharge opening to the last said discharge opening in the series thereof.

3. The heat storage unit of claim 2, in which the cross-section of said last discharge opening in the series as 70 to 90% of the sum of all cross-sections of said series of openings.

4. The heat storage unit of claim 2, in which said openings are comprised by outlet pipes, said outlet pipes being directed obliquely towards and into said mass of heat storage material.

5. The heat storage unit of claim 4, in which the outlets of said pipes are directed perpendicular to a vertical plane including the axis of said tank.

* * * * *